(12) United States Patent  
Westergaard Andersen (10) Patent No.: US 12,037,199 B2
(45) Date of Patent: Jul. 16, 2024

(54) HYGIENIC PRODUCT SUPPORT

(71) Applicant: AMMERAAL BELTECH MODULAR A/S, Vejle (DK)

(72) Inventor: Kenneth Westergaard Andersen, Vejle (DK)

(73) Assignee: AMMERAAL BELTECH MODULAR A/S, Vejle (DK)

( * ) Notice: Subject to any disclaimer, the term of this patent is extended or adjusted under 35 U.S.C. 154(b) by 80 days.

(21) Appl. No.: 17/791,578

(22) PCT Filed: Jan. 15, 2021

(86) PCT No.: PCT/DK2021/050013
§ 371 (c)(1),
(2) Date: Jul. 8, 2022

(87) PCT Pub. No.: WO2021/143992
PCT Pub. Date: Jul. 22, 2021

(65) Prior Publication Data
US 2023/0035279 A1 Feb. 2, 2023

(30) Foreign Application Priority Data
Jan. 16, 2020 (DK) .......................... PA 2020 70030

(51) Int. Cl.
*B65G 17/08* (2006.01)
*B65G 17/46* (2006.01)
(52) U.S. Cl.
CPC ............ *B65G 17/08* (2013.01); *B65G 17/46* (2013.01)

(58) Field of Classification Search
CPC . B65G 17/08; B65G 17/46; B65G 2201/0202
(Continued)

(56) References Cited

U.S. PATENT DOCUMENTS 5,165,514 A * 11/1992 Faulkner ................ B65G 17/12
198/801
5,413,211 A * 5/1995 Faulkner .............. B65G 17/086
198/853
(Continued)

FOREIGN PATENT DOCUMENTS

CN 1735546 A 2/2006
CN 101094799 A 12/2007
(Continued)

OTHER PUBLICATIONS

International Search Report for PCT/DK2021/050013 mailed Apr. 23, 2021.
Written Opinion for PCT/DK2021/050013 mailed Apr. 23, 2021.

*Primary Examiner* — Mark A Deuble
(74) *Attorney, Agent, or Firm* — Schmeiser, Olsen & Watts, LLP (57) ABSTRACT

A hygienic interface structure is provided for installation in a modular conveyor belt of the type assembled from a plurality of substantially identical modular belt links, where the modular belt link has a main body extending in the modular belt link's width direction, and where a plurality of eye parts extend forwards and rearwards from the main body, the eye parts being spaced in the width direction of the modular belt link, such that when two modular conveyor bell links are pushed together, the eye parts on one link will inter-fit between eye parts on the other modular belt link.

14 Claims, 5 Drawing Sheets

(58) Field of Classification Search
USPC .............. 198/851–853, 690.2, 693, 697, 698
See application file for complete search history.

(56) References Cited

U.S. PATENT DOCUMENTS

| | | | | |
|---|---|---|---|---|
| 5,469,956 | A * | 11/1995 | Greve | B65G 17/08 |
| | | | | 198/801 |
| 6,305,530 | B1 | 10/2001 | Guldenfels | |
| 6,332,531 | B1 | 12/2001 | Damkjaer | |
| 6,382,404 | B1 * | 5/2002 | Guldenfels | B65G 17/32 |
| | | | | 198/853 |
| 6,467,610 | B1 | 10/2002 | MacLachlan | |
| 6,695,135 | B1 | 2/2004 | Lapeyre | |
| 6,811,021 | B1 * | 11/2004 | Corley | B65G 17/30 |
| | | | | 198/853 |
| 7,267,222 | B2 * | 9/2007 | Montemartini | B65G 17/40 |
| | | | | 198/853 |
| 9,540,177 | B1 | 1/2017 | Yasinski | |
| 2002/0125108 | A1 | 9/2002 | Straight et al. | |
| 2009/0283388 | A1 | 11/2009 | Andersen | |

FOREIGN PATENT DOCUMENTS

| | | |
|---|---|---|
| EP | 1 300 349 A1 | 4/2003 |
| EP | 1445216 A2 | 8/2004 |
| WO | 2004/063060 A1 | 7/2004 |
| WO | 2007/016807 A1 | 2/2007 |
| WO | 2016095933 A1 | 6/2016 |

* cited by examiner

HYGIENIC PRODUCT SUPPORT

CROSS-REFERENCE TO RELATED APPLICATIONS

This application claims priority to PCT Application No. PCT/DK2021/050013, having a filing date of Jan. 15, 2021, which is based DK Application No. PA 2020 70030, having a filing date of Jan. 16, 2020, the entire contents both of which are hereby incorporated by reference.

FIELD OF TECHNOLOGY

The following relates to a hygienic interface structure for installation in a modular conveyor belt of the type assembled from a plurality of substantially identical modular belt links.

Furthermore, the following is directed to a method of constructing such a conveyor belt.

BACKGROUND

In the art it is well-known to convey materials on conveyors and particularly if the materials are to be conveyed on an incline or decline, interface structures are used in order to support and help the material being transported on sloping conveyor sections.

In some instances, if the product supports were not provided, the material would slide back or roll back on the conveyor due to the inclined position/orientation of the conveyor belt.

Particularly in the food industry there are high requirements to the hygienic standards in that it is of the utmost importance to make sure that the apparatus is used in processing of for example foodstuffs are maintained at a very high hygienic standard. It is of utmost importance that foodstuffs are not contaminated by the processing apparatus and as such it is vital that the personnel operating the apparatuses are able to clean all parts of the apparatus thoroughly in order to avoid contamination.

In the art of conveyors including interface structures, the interface structures are typically molded as integrated elements of special modular belt links then built into the conveyor belt together with regular modular belt links. This means that the base of an interface structure more or less has the same configuration as the adjacent modular belt links such that it is possible to integrate them seamlessly in a modular belt link in the same manner as traditional belt links.

For a number of reasons such interface structures have some inherent drawbacks, for example modules manufactured with the interface structure often have corners or ridges which are very difficult to clean thoroughly. In the positions where the interface structures are integrated/inserted, very narrow spaces occur, which are difficult to clean. Also, the molds for casting the interface structures are relatively expensive compared to the number of elements being cast and furthermore the molds are rather advanced in that in order to achieve a flawless molding, i.e., the melted polymer must be injected into the mold at the right temperature and pressure and allowed to distribute in the mold in order to avoid flashing or other detrimental side effects of the injection molding process.

SUMMARY

An aspect relates to an improved interface structure, particularly an interface structure which facilitates easy cleaning in order to maintain or improve the certainty of a high hygienic standard.

Embodiments of the invention address this by providing an interface structure for allowing peripheral devices to be mounted onto a modular conveyor belt, where the interface structure is adapted for installation in or on a modular conveyor belt, where the conveyor belt is of the type assembled from a plurality of substantially identical modular belt links where one or more modular belt links forms lateral rows, where each modular belt link has a main body extending in the modular belt link's width direction, and where a plurality of eye parts extend forwards and rearwards from the main body, the eye parts being spaced in the width direction of the modular belt link creating an opening between adjacent eye parts, such that when two modular conveyor belt links are pushed together, the eye parts on one link will inter-fit between eye parts on the other modular belt link, and where lateral apertures in all eye parts are provided, such that when the eye parts of modular belt links in one row are overlapping eye parts in an adjacent row a through-going aperture is formed from side to side of the conveyor belt, and by inserting a connection pin through the lateral through-going aperture, adjacent modular belt links will be hingedly connected, where the interface structure is provided with a main support body having a width in an x-direction, a height in a y-direction, and a thickness in a z-direction, and where a plurality of connection structures extend from an xy-plane defined by the x- and y-directions, the connection structures extending away from the xy-plane, such that part of each connection structure extends past the lower edge of the main support body, and where the distance in the x-direction between adjacent connection structures corresponds to one or more times the distance between adjacent eye-parts in the modular belt link into which the interface structure is to be installed, and where adjacent a distal end of the connection structures an aperture in the x-direction through the distal end of the connection structure is provided, such that either:
  by removing one or more eye parts from modular belt links in a row without removing the modular belt links as such, the distal end of the connection structures comprising the aperture through the distal end of the connection structure of the interface structure may be inserted in the space left by the removed eye parts such that the connection pin may pass through the aperture provided in the distal end of the connection structure of the interface structure, thereby integrating the interface structure into the modular conveyor belt, or
  the eye parts of adjacent modular belt links are spaced sufficiently laterally, thereby creating an opening, where the distal end of the connection structure of the interface structure may be inserted in the space between two eye parts such that the connection pin may pass through the aperture provided in the distal end of the connection structure of the interface structure, thereby integrating the interface structure into the modular conveyor belt.

The interface structure allows different peripheral devices to be installed on an existing or a new conveyor belt, without replacing modules in the modular conveyor belt structure. The peripheral devices may in principle be any type of device, but in particular peripheral devices such as product supports of varying design, shape and size, as well as friction mats, roller elements, brushes and so on, shall be understood as peripheral devices.

Particularly the feature that the interface structure according to embodiments of the present invention is a separate element suitable to be integrated into a traditional modular conveyor belt by the same means and with the same open structure as the conveyor belt into which it is integrated provides a number of advantages. As the interface structure is only connected to the modular conveyor belt in a number of positions it leaves a lot of open space free which is straightforward to clean. At the same time, as embodiments of the present invention are integrated by eye-parts similar to the eye-parts already provided in the modular conveyor belts no special cleaning means are required as compared to normal modular conveyor belts in that the assembly and all other details are substantially the same as with traditional modular conveyor belts.

Furthermore, the modular conveyor belt as such is not changed. The interface structure is added to the modular conveyor either by removing a few eye parts of the modular conveyor belt, making room for the distal ends of the connection structures, or in instances where narrow eye parts are used leaving a space between adjacent eye parts belonging to adjacent modular belt links when the modular conveyor is assembled, the distal ends of the connection structures are fitted in this free space. With both options only a minor intrusion into the modular belt structure is necessary.

In a further embodiment of the invention the distance "a" in the y-direction between the load carrying surface of the conveyor belt and the lower edge of the main support body is between 0 mm and 40 mm, or 1.5 mm to 30 mm.

In this particular embodiment the lower edge of the interface structure is elevated relative to the product carrying surface of the modular conveyor belt such that an opening is provided. This opening further improves the cleanability of the conveyor belt and as such improves the possibility of retaining a high hygienic standard for these types of conveyor belts.

It is also foreseen, with the distance being 0 mm, that the main support body is in contact with the conveyor belt. This is interesting for some applications when a product support is mounted in the interface structure, where the products to be conveyed may be very fluid or small particles.

In a further embodiment connection structures extend on both sides of the xy-plane, defined by the x- and y-directions.

Furthermore, it is contemplated, in a further embodiment, that connection structures on one side of the xy-plane is off-set relative to connection structures on the opposite side of the interface structure.

One particular embodiment is where the offset is at least one or more times the distance between adjacent eye-parts in the modular belt link into which the interface structure is to be installed. However, also other off-set ratios are contemplated.

In this embodiment where connection structures are provided extending on both sides of the plane of the interface structure the interface structure is very stable in that it is not able to swing which is the case when it is only supported on one side, where it may flip down such that the plane of the interface structure and any peripheral device is more or less parallel with the surface of the conveyor belt.

This will in some instances provide advantages with this spring action, but for most traditional applications it is desirable to fix the interface structure in a predetermined angle. By varying the length of the connection structures on either side of the interface structure it is possible to arrange the interface structure at a desired angle relative to the load carrying surface of the conveyor belt.

In a further embodiment of the invention the distance in the z-direction between the center of apertures in connection structures arranged on opposite sides of the xy-plane corresponds to the distance between apertures in the forwards extending and rearwards extending eye-parts of the modular belt links from which the modular conveyor is assembled.

Traditionally, modular belt links are assembled from modular belt links having a determined distance (pitch) between eye-parts on the front and rear edges (in the z-direction). By providing the same distance with the interface structure it is possible to assemble and integrate the interface structure according to embodiments of the present invention with the same modular distance such that for example the distance b between the apertures in the connection structures corresponds fully to the same distance in a single modular belt link.

In this context it should be noted that modular belt links are typically manufactured in standard dimensions such that when the different properties of the interface structure according to embodiments of the present invention is defined with respect to the modular belt links from which the modular conveyor is assembled. This implies that the hygienic interface structure is also manufactured such that it will fit with standard modular belt links. Typically, the pitch will be 2, 4 or 6 inches and as such the distance between eye-parts in the connection structures of the interface structure will also be arranged with similar distances.

In a still further embodiment of the invention the peripheral device is a hygienic product support interfaced with the interface structure, the hygienic support structure having a support plane extending in the y-axis direction, and having a lower edge towards the conveyor belts' support plane and an upper edge away from the conveyor belts support plane and where the upper edge is provided with an integrated bulge, which bulge extends on both sides of the xy-plane defined by the x- and y-directions.

The bulge along the upper edge creates a wider (less sharp) edge such that products being transferred from one conveyor to a conveyor with a product support having this bulge will not be impacted in the same manner by the product support when they fall from one conveyor onto the other conveyor. This has particularly for fish, an undesirable effect in that it may generate marks or discoloring in the product which are being transported, and as such creates undesirable side effects. The bulge due to its larger dimension distributes the pressure over a larger area such that the risk of creating marks or discoloration is substantially eliminated.

A further feature in this connection is the fact that due to the molding technique it is possible to have the injection mold divided along the xy-plane such that half the bulge will be in one half of the mold and the other half of the bulge will be in the other half of the mold. This is not possible when, as is the case with traditional injection molding of modular belt links, the corresponding division of the mold is made in the zx-plane. Also, the bulge may be entirely in one half or the other.

Further features also include various designs of the hygienic support as such. In the embodiment discussed above the upper edge was provided with a bulge (or showing a bulbous cross-section), but it is also contemplated that part of the upper section of the support surface may be bent or curved out of the x-y plane. Additionally, the ends between the lower edge and the upper edge may be provided with wall segments in the zy-plane, whereby the hygienic support forms a cup. Still further the hygienic support surface in the x-y plane may be provided with drainage apertures, formed for example as holes or slits.

In some embodiments it may also be desirable to provide the peripheral devices surface with a softer layer, for example rubber ribs upstanding from the surface or foam or the like. Such softer layers may either be 2K-molded or applied afterwards.

It shall also be noted that a hygienic interface structure may be provided with any combination of these features, such that for example drainage is provided in a cup shaped support etc.

In further embodiments the connection structures extend on both sides of the xy-plane defined by the x- and y-directions, and where connection structures on one side of the xy-plane are off-set at least one or more times the distance between adjacent eye-parts in the x-direction in the modular belt link into which the product support is to be installed, and/or the connection structures extend on both sides of the xy-plane defined by the x- and y-directions, and where connection structures on one side of the xy-plane are in-line along the intended travelling direction of the conveyor belt, with connection structures on the opposite side.

Also in embodiments the distance in the z-direction between the center of apertures in connection structures arranged on opposite sides of the xy-plane corresponds to the distance between apertures in the forwards extending and rearwards extending eye-parts of the modular belt links from which the modular conveyor is assembled or the peripheral device is a hygienic product support interfaced with the interface structure, the hygienic support structure having a support plane extending in the y-axis direction, and having a lower edge towards the conveyor belts' support plane and an upper edge away from the conveyor belts support plane and where the upper edge is provided with an integrated bulge, which bulge extends on both sides of the xy-plane defined by the x- and y-directions.

In an embodiment the product support has a bulge in a cross-section in a zy-plane has a substantially round, oval or tear shape and/or wherein an upper part of the product support surface has a bent section bent out of the xy-plane, either in a curved cross-section or straight line and/or wherein at least part of the product support surface is provided with drainage openings either in the shape of holes or slits.

Further embodiments see the product support having lateral sides provided with substantially orthogonal walls in a yz-plane, forming a cup, and/or where the support surface is provided with cushioning sections made from a resilient or foam material.

In a particular embodiment the hygienic product support is integral with the main support body, thereby forming a single element whereas in other embodiments the interface between the interface structure and the peripheral device comprises either:

a click-in feature with corresponding and mating protrusions and indentations provided on the interface body and peripheral device respectively or when the peripheral device is mounted on the interface structure a number of overlapping second apertures wherein connecting studs are inserted thereby locking the peripheral device to the interface body, or corresponding and mating adhesive surfaces on the interface body and peripheral device respectively, such that when the adhesive surfaces are brought into contact and adhesive contact is established between the peripheral device and the interface body, or where the interface body and the peripheral device are provided with mating surfaces suitable to be heat fused together.

Embodiments of the invention are also directed to a method of assembling a modular conveyor belt comprising a plurality of interface structures as described above, wherein the conveyor belt is assembled from a plurality of substantially identical modular belt links, where the modular conveyor belt links have a main body extending in an x-direction corresponding to the modular belt link's width direction, and where a plurality of eye parts extend forwards and rearwards in a z-direction from the main body, the eye parts being spaced in the width direction of the modular belt link, where forwards extending eye parts are offset relative to rearwards extending eye parts, such that when two modular conveyor belt links are pushed together the eye parts on one link will inter-fit between eye parts on the other modular belt link, and where either eye parts are removed from at least one of the adjacent modular belt links, where the eye parts are spaced in the x-direction corresponding to the distance in the same direction between the connection structures of the interface structure, and where the interface structure is inter-fitted in the spaces left by the removed eye parts, such that the apertures in the eye parts of the modular belt links and the apertures in the connection structures overlap, whereafter a connection pin is inserted through the overlapping apertures hingedly interlocking the interface structure and the adjacent modular belt links or wherein the space between adjacent eye parts is created by the eye parts in the x-direction has a smaller dimension than the distance between adjacent eye parts in the same direction, whereby an opening is provided, where the connection structures are dimensioned to fit inside this opening, whereby the connection pin may also be inserted through the aperture provided near the distal end of the connection structure.

It is clear that such a conveyor belt assembled according to this method will enjoy all the advantageous features of embodiments of the present invention as already outlined above.

BRIEF DESCRIPTION

Some of the embodiments will be described in detail, with references to the following Figures, wherein like designations denote like members, wherein.

DETAILED DESCRIPTION

Figure 1:
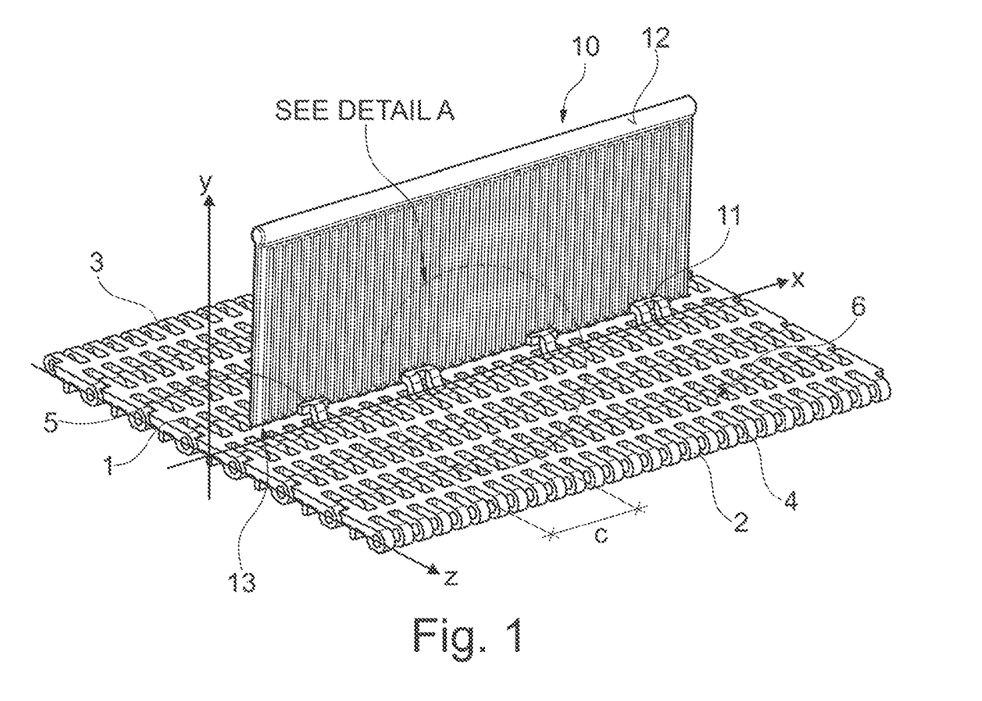
FIG. 1 illustrates an asymmetric view of a modular conveyor belt.

In FIG. 1 is illustrated an asymmetric view of a modular conveyor belt 1 in which an interface structure 5 is provided with a product support 10 according to embodiments of the present invention is integrated.

In order to clarify the explanation of embodiments of the present invention a coordinate system comprising three axes has been superposed on the various figures. The x-direction is in the direction of the width of the conveyor belt 1, the y-direction in the direction of the thickness of the conveyor belt 1 and the z-direction in the longitudinal direction of an assembled conveyor belt 1 as illustrated in FIG. 1. The z-direction is furthermore the intended travelling direction of the conveyor belt.

The modular conveyor belt 1 is assembled from a plurality of substantially identical injection molded modular belt links. In the embodiment illustrated in FIG. 1 it appears as if one single belt module spans the entire width (in the x-direction), but it is known to assemble modular belt links of this type having a number of modular belt links arranged side by side in the x-direction in order to obtain the desired width.

The modular belt links are provided with eye-parts 2, 3 extending in a forward direction and a rearward direction. Furthermore, eye-parts 2 on a forward side of a modular belt link are offset relative to eye-parts 3 on the rearward direction of a modular belt link such that it is possible to interleaf the modular belt links. Furthermore, the eye-parts are provided with apertures 4 such that when the eye-parts are interleafed as described above the apertures 4 will overlap. In this manner it is possible to insert a connection pin (not illustrated) through overlapping apertures and in this manner create a hinge-like connection between adjacent modular belt links.

The interface structure 5 is provided with connection structures 11 where the connection structures 11 arch away from the interface structure's plane (xy-plane). Each connection structure is in a distal end provided with an aperture 4' (see FIGS. 5 and 6) such that when an interface structure 5 according to embodiments of the present invention is built-into/onto a conveyor belt 1 as explained above the apertures 4' in the connection structures 11 will also be arranged in an overlapping relationship with the apertures 4 in the eye-parts 2, 3. In this manner, when inserting the connection pin, the hygienic interface structure will be locked into the conveyor belt in a manner similar to adjacent belt links.

The interface structure 5 is built into a conveyor belt by making room in the modular belt such that the connection structures 11 may be arranged adjacent eye parts and connected laterally by the connection pin.

In order for the interface structure 5 to be integrated in the conveyor belt 1 the distance "c" between the connection structures 11 shall be a multiple of the distance between eye-parts 2, 3. Furthermore, the dimension of the connection structure 11 itself and particularly the aperture 4' shall be such that it is possible to interleaf the connection structure with the aperture in between adjacent eye-parts 3, 4 in either the rear side or the forward side or both of a modular belt link.

Figure 2:
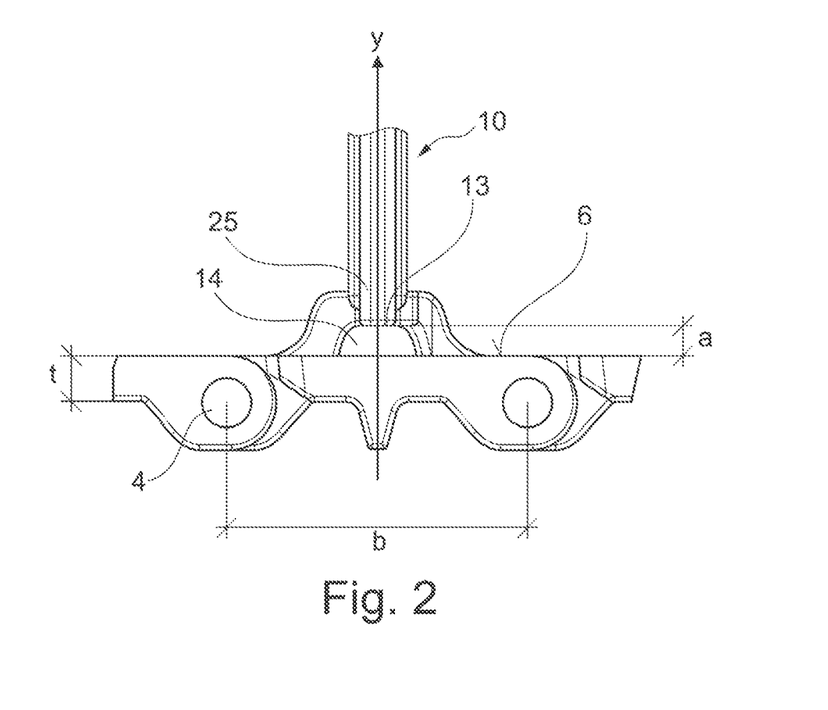
FIG. 2 illustrates a cross-section through part of a conveyor belt where a hygienic interface structure is arranged.

During the construction or after installation of a conveyor belt made of modular belt links a number of eye-parts will be removed prior to arranging the hygienic interface structure 10 in the belt. Turning to FIG. 2 a cross-section through part of a conveyor belt where an interface structure 5 is arranged is illustrated.

In the y-direction the interface structure 5 has a lower edge 13 (see also FIG. 1). As illustrated in FIG. 2 there is an open space 14 between the upper side 6 of the conveyor belt and the lower edge 13 of the interface structure 5. Furthermore, the interface structure 5 has a main support body 25 providing stability to the interface structure and the connection structures 11. In the illustration part of a product support 10 may be seen extending up from the main support body 25.

In an embodiment, this space 14 is dimensioned such that products which are transported on the conveyor belt 1 are not able to slide under the interface structure 5, but on the other hand the space 14 has a sufficient dimension such that it is possible to efficiently clean the conveyor belt's surface between the upper side 6 of the conveyor belt and the lower edge 13 of the interface structure 5.

This distance may be decided/determined by the distance a between the upper side of the conveyor belt 6 and the distance to the lower edge 13 of the interface structure 10. Tests have indicated that designing the connection structures such that the distance a is between 0 mm and 40 mm will provide sufficient space 14 and at the same time provide sufficient support for products transported on the conveyor belt 1. It is clear that with a distance of 0 mm the interface structure 5 is in contact with the upper surface of the conveyor belt 6, and no open space is available. For cleaning purposes this is no problem as no foreign matter will be lodged in the non-existent space. Furthermore, it is foreseen that the space 14 is selected according to the application, such that even for small spaces 14, the nature of the objects/material to be transported will allow for through cleaning.

Figure 3:
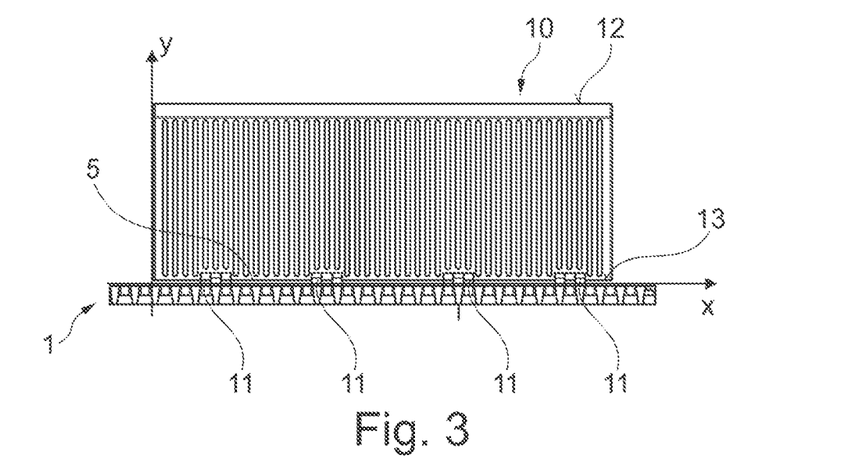
FIG. 3 illustrates a vertical cross-section through a conveyor belt.

In FIG. 3 is illustrated a vertical cross-section through a conveyor belt on which conveyor belt 1 an interface structures with a product support 10 according to embodiments of the present invention is arranged. In this embodiment four sets of connection structures 11 are arranged to be integrated in the conveyor belt 1, and the interface structure in the x-direction does not extend all the way to the edges of the conveyor belt 1. This is due to the fact that many conveyor structures will have fixed side limitations, particularly on inclined passages such that product transported on the conveyor 1 will not be able to spill off the sides of the conveyor belt, but will be maintained on the conveyor belt 1 by these side limitations (not illustrated).

Figure 4:
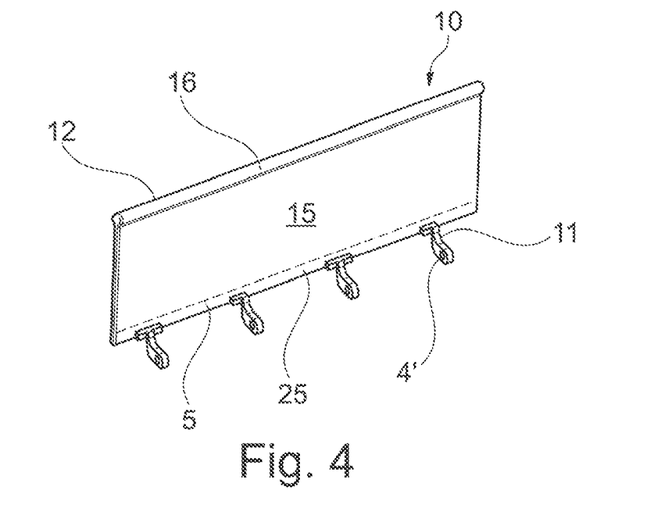
FIG. 4 illustrates an asymmetric view of a interface structure provided with four connection structures.

In FIG. 4 is illustrated an asymmetric view of an interface structure 5 with a product support 10 provided with four connection structures 11 extending in an arched manner away from the main support body 25 of the interface structure 5. The product support has a support face 15. In this embodiment the upper edge 12 of the product support 10 is provided with a bulge 16. This bulge has a cross-section as illustrated with reference to FIG. 5, a substantially circular cross-section and serves to lessen the impact of products/materials transferred to the conveyor belt which may accidentally hit the bulge. For certain types of products, particularly fish, vegetables and other fragile products, the impact against the product support may more or less mark or crack the product which is being transferred to the conveyor belt, and therefore by providing the bulge 16 the impact area is enlarged thereby providing a larger area to distribute the impact force which is thereby lessened as compared to a normal product supports.

Furthermore, as the product support may be manufactured by an injection molding process the two mold halves defining the cavity may be divided along the xy-plane such that the bulge can be cast directly at the same time as casting the entire product support.

Figure 6A:
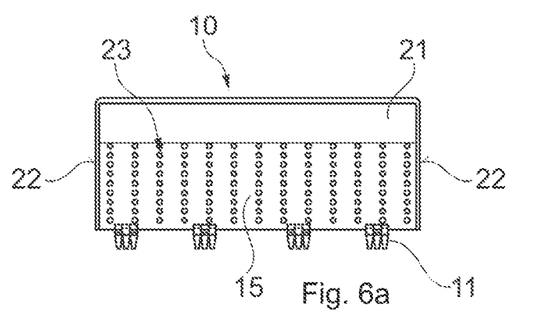
FIG. 6a—illustrates various embodiments of a hygienic product support.
Figure 6B:
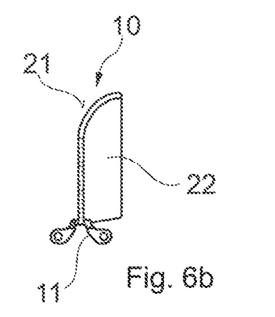
FIG. 6b illustrates various embodiments of a hygienic product support.
Figure 6C:
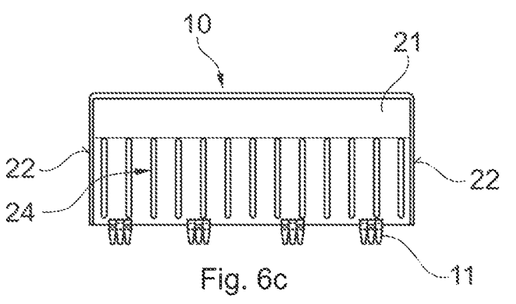
FIG. 6c illustrates various embodiments of a hygienic product support.
Figure 6D:
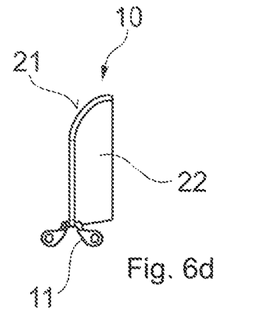
FIG. 6d illustrates various embodiments of a hygienic product support.
Figure 6E:
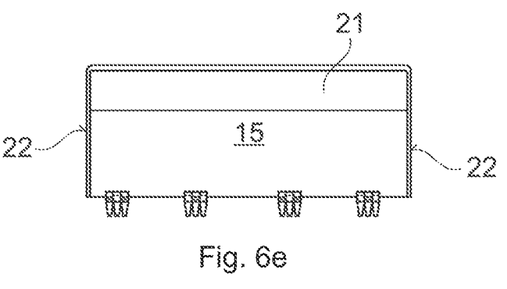
FIG. 6e illustrates various embodiments of a hygienic product support.
Figure 6F:
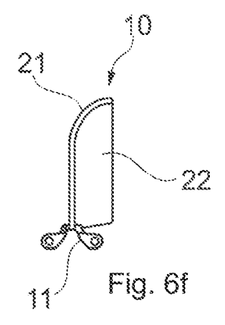
FIG. 6f illustrates various embodiments of a hygienic product support.
Figure 6G:
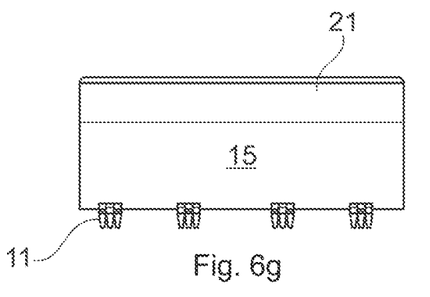
FIG. 6g illustrates various embodiments of a hygienic product support.
Figure 6H:
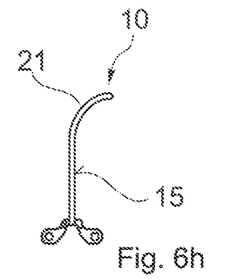
FIG. 6h illustrates various embodiments of a hygienic product support.
Figure 6I:
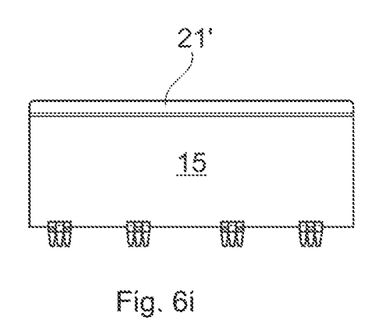
FIG. 6*i* illustrates various embodiments of a hygienic product support.
Figure 6J:
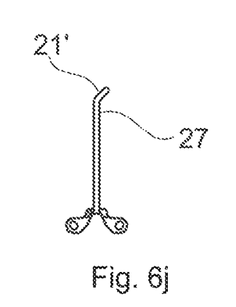
FIG. 6*j* illustrates various embodiments of a hygienic product support.
Figure 6K:
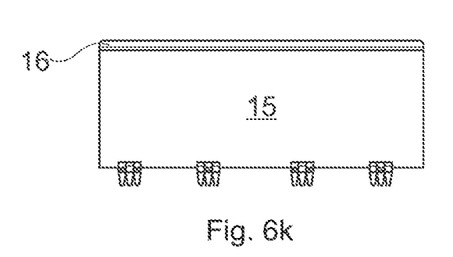
FIG. 6*k* illustrates various embodiments of a hygienic product support.
Figure 6L:
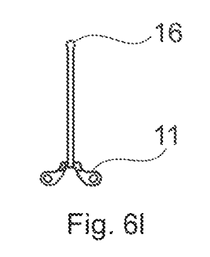
FIG. 6*l* illustrates various embodiments of a hygienic product support.
Figure 6M:
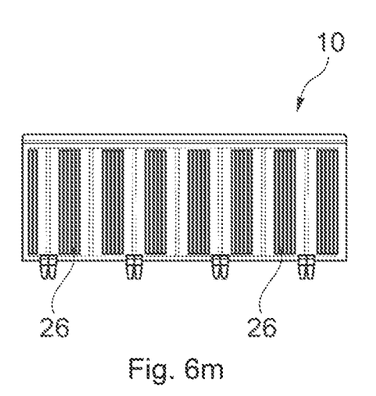
FIG. 6*m* illustrates various embodiments of a hygienic product support.
Figure 6N:
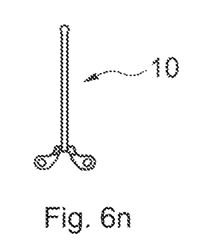
FIG. 6*n* illustrates various embodiments of a hygienic product support.

In FIG. 6a-n are illustrated various embodiments of the hygienic interface structure 5 with product supports 10. In FIG. 6a is illustrated a view of a product support in an xy-plane and the same product support is illustrated in FIG. 6b in an yz-plane. The product support 10 is provided with a curved upper section 21. Furthermore, the ends of the product support 10 are provided with walls 22 such that the product support is provided with a cup shape. Furthermore, the support surface 15 of the product support is provided with apertures 23 such that any liquid, for example water, may drain off the product support during steep inclines or declines.

Turning to FIGS. 6c and 6d a similar construction is provided. However, the drainage structure in this embodiment is in the shape of slits 24. Otherwise like features are provided with like reference numbers.

In FIGS. 6c and 6f is illustrated a product support substantially as illustrated with reference to FIGS. 6a-d, however, in this embodiment the product support surface 15 is not provided with drainage means, but is constituted by a substantially coherent surface.

In the embodiment illustrated with reference to FIGS. 6g and 6h a product support without end-walls is illustrated, however, an upper section of the product support is provided with a bent section as was the case above.

Furthermore, with reference to FIG. 6i-j a product support also having a bent section, but in this embodiment the bent section 21' is created by creating a sharp bend 27 whereas the curved sections 21 discussed above are more in the shape of a soft curve.

Figure 5:
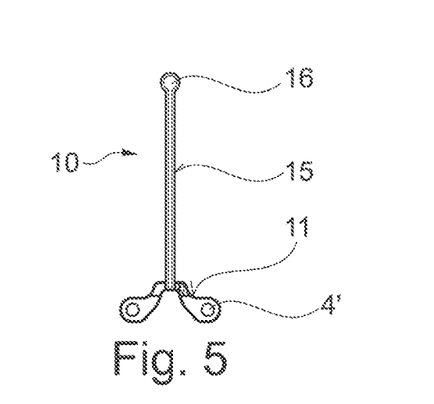
FIG. 5 illustrates a bulge with a substantially circular cross-section.

In FIG. 6k-l is illustrated a product support 10 substantially corresponding to the product support discussed above with reference to FIG. 5.

Finally, turning to FIG. 6m-n a product support 10 provided with soft zones 26 on the product support surface 15. The soft zones may for example be provided by ribs extending from the xy-plane of the product support where the ribs are made from a soft material, for example rubber or another suitable elastomer or the soft zones may be made by foam or any other resilient material.

Figure 7A:
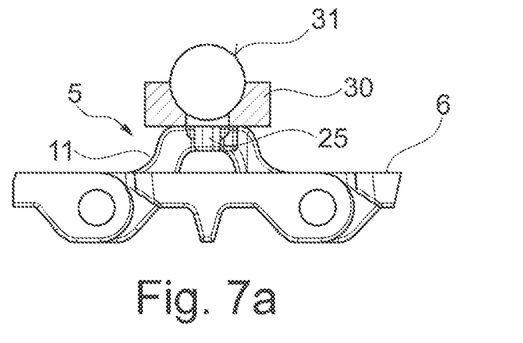
FIG. 7*a* illustrates various embodiments of peripheral devices.

In FIG. 7a is illustrated an interface structure 5, with a peripheral device. In the main support body 25 is provided a ball cage 30 in which a ball 31 is rotatably accommodated.

Figure 7B:
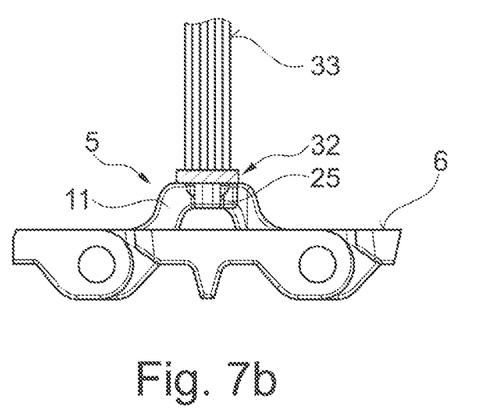
FIG. 7*b* illustrates various embodiments of peripheral devices.

In FIG. 7b is illustrated an embodiment where a brush comprising an engagement part 32 and bristles 33 is attached to the interface structure 5, such that the bristles 33 appears at an angle to the conveyor belts surface 6.

Figure 7C:
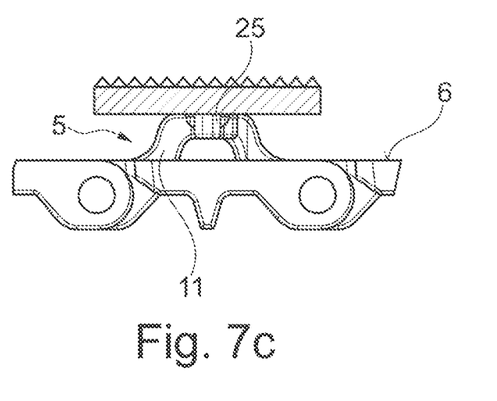
FIG. 7*c* illustrates various embodiments of peripheral devices.

Further in FIG. 7c an embodiment where the peripheral device is in the shape of a high friction plate 34 is illustrated.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

Hygienic Interface Structure

Field of the Invention

The present invention relates to a hygienic interface structure for installation in a modular conveyor belt of the type assembled from a plurality of substantially identical modular belt links.

Furthermore, the invention is directed to a method of constructing such a conveyor belt.

BACKGROUND OF THE INVENTION

In the art it is well-known to convey materials on conveyors and particularly if the materials are to be conveyed on an incline or decline, interface structures are used in order to support and help the material being transported on sloping conveyor sections.

In some instances, if the products supports were not provided, the material would slide back or roll back on the conveyor due to the inclined position/orientation of the conveyor belt.

Particularly in the food industry there are high requirements to the hygienic standards in that it is of the utmost importance to make sure that the apparatus is used in processing of for example foodstuffs are maintained at a very high hygienic standard. It is of utmost importance that food-stuffs are not contaminated by the processing apparatus and as such it is vital that the personnel operating the apparatuses are able to clean all parts of the apparatus thoroughly in order to avoid contamination.

In the art of conveyors including interface structures, the interface structures are typically moulded as integrated elements of special modular belt links then built into the conveyor belt together with regular modular belt links. This means that the base of a interface structure more or less has the same configuration as the adjacent modular belt links such that it is possible to integrate them seamlessly in a modular belt link in the same manner as traditional belt links.

For a number of reasons such interface structures have some inherent drawbacks, for example modules manufactured with the interface structure often have corners or ridges which are very difficult to clean thoroughly. In the positions where the interface structures are integrated/inserted, very narrow spaces occur, which are difficult to clean. Also, the moulds for casting the interface structures are relatively expensive compared to the number of elements being cast and furthermore the moulds are rather advanced in that in order to achieve a flawless moulding, i.e. the melted polymer must be injected into the mould at the right temperature and pressure and allowed to distribute in the mould in order to avoid flashing or other detrimental side effects of the injection moulding process.

Object of the Invention

Consequently, there is a need for an improved interface structure, particularly an interface structure which facilitates easy cleaning in order to maintain or improve the certainty of a high hygienic standard.

Description of the Invention

The present invention addresses this by providing an interface structure for allowing peripheral devices to be mounted onto a modular conveyor belt, where said interface structure is adapted for installation in or on a modular conveyor belt, where the conveyor belt is of the type assembled from a plurality of substantially identical modular belt links where one or more modular belt links forms lateral rows, where each modular belt link has a main body extending in the modular belt link's width direction, and where a plurality of eye parts extend forwards and rearwards from said main body, said eye parts being spaced in the width direction of the modular belt link creating an opening between adjacent eye parts, such that when two modular conveyor belt links are pushed together, the eye parts on one link will inter-fit between eye parts on the other modular belt link, and where lateral apertures in all eye parts are provided, such that when the eye parts of modular belt links in one row are overlapping eye parts in an adjacent row a through-going aperture is formed from side to side of the conveyor belt, and by inserting a connection pin through said lateral through-going aperture, adjacent modular belt links will be hingely connected, where the interface structure is provided with a main support body having a width in an x-direction, a height in a y-direction, and a thickness in a z-direction, and where a plurality of connection structures extend from an xy-plane defined by the x- and y-directions, said connection structures extending away from said xy-plane, such that part of each connection structure extends past the lower edge of said main support body, and where the distance in the x-direction between adjacent connection structures corresponds to one or more times the distance between adjacent eye-parts in the modular belt link into which the interface structure is to be installed, and where adjacent a distal end of the connection structures an aperture in the x-direction through said distal end of the connection structure is provided, such that either:

by removing one or more eye parts from modular belt links in a row without removing the modular belt links as such, the distal end of the connection structures comprising the aperture through said distal end of the connection structure of the interface structure may be inserted in the space left by the removed eye parts such that the connection pin may pass through the aperture provided in said distal end of the connection structure of the interface structure, thereby integrating said interface structure into the modular conveyor belt, or the eye parts of adjacent modular belt links are spaced sufficiently laterally, thereby creating an opening, where the distal end of the connection structure of the interface structune may be inserted in the space between two eye parts such that the connection pin may pass through the aperture provided in said distal end of the connection structure of the interface structure, thereby integrating said interface structure into the modular conveyor belt.

The interface structure allows different peripheral devices to be installed on an existing or a new conveyor belt, without replacing modules in the modular conveyor belt structure. The peripheral devices may in principle be any type of device, but in particular peripheral devices such as product supports of varying design, shape and size, as well as friction mats, roller elements, brushes and so on, shall be understood as peripheral devices.

Particularly the feature that the interface structure according to the present invention is a separate element suitable to be integrated into a traditional modular conveyor belt by the same means and with the same open structure as the conveyor belt into which it is integrated provides a number of advantages. As the interface structure is only connected to the modular conveyor belt in a number of positions it leaves a lot of open space free which is straightforward to clean. At the same time, as the present invention is integrated by eye-parts similar to the eye-parts already provided in the modular conveyor belts no special cleaning means are required as compared to normal modular conveyor belts in that the means of assembly and all other details are substantially the same as with traditional modular conveyor belts.

Furthermore, the modular conveyor belt as such is not changed. The interface structure is added to the modular conveyor either by removing a few eye parts of the modular conveyor belt, making room for the distal ends of the connection structures, or in instances where narrow eye parts are used leaving a space between adjacent eye parts belonging to adjacent modular belt links when the modular conveyor is assembled, the distal ends of the connection structures are fitted in this free space. With both options only a minor intrusion into the modular belt structure is necessary.

In a further advantageous embodiment of the invention the distance "a" in the y-direction between the load carrying surface of the conveyor belt and the lower edge of said main support body is between 0 mm and 40 mm, more preferred 1.5 mm to 30 mm.

In this particular embodiment the lower edge of the interface structure is elevated relative to the product carrying surface of the modular conveyor belt such that an opening is provided. This opening further improves the cleanability of the conveyor belt and as such improves the possibility of retaining a high hygienic standard for these types of conveyor belts.

It is also foreseen, with the distance being 0 mm, that the main support body is in contact with the conveyor belt. This is interesting for some applications when a product support is mounted in the interface structure, where the products to be conveyed may be very fluid or small particles.

In a further advantageous embodiment connection structures extend on both sides of the xy-plane, defined by the x- and y-directions.

Furthermore it is contemplated, in a further embodiment, that connection structures on one side of the xy-plane is off-set relative to connection structures on the opposite side of the interface structure.

One particular embodiment is where the offset is at least one or more times the distance between adjacent eye-parts in the modular belt link into which the interface structure is to be installed. However, also other off-set ratios are contemplated.

In this embodiment where connection structures are provided extending on both sides of the plane of the interface structure the interface structure is very stable in that it is not able to swing which is the case when it is only supported on one side, where it may flip down such that the plane of the interface structure and any peripheral device is more or less parallel with the surface of the conveyor belt.

This will in some instances provide some advantages with this spring action, but for most traditional applications it is desirable to fix the interface structure in a predetermined angle. By varying the length of the connection structures on either side of the interface structure it is possible to arrange the interface structure at a desired angle relative to the load carrying surface of the conveyor belt.

In a further embodiment of the invention the distance in the z-direction between the center of apertures in connection structures arranged on opposite sides of the xy-plane corresponds to the distance between apertures in the forwards extending and rearwards extending eye-parts of the modular belt links from which the modular conveyor is assembled.

Traditionally, modular belt links are assembled from modular belt links having a determined distance (pitch) between eye-parts on the front and rear edges (in the z-direction). By providing the same distance with the interface structure it is possible to assemble and integrate the interface structure according to the present invention with the same modular distance such that for example the distance b between the apertures in the connection structures corresponds fully to the same distance in a single modular belt link.

In this context it should be noted that modular belt links are typically manufactured in standard dimensions such that when the different properties of the interface structure according to the present invention is defined with respect to the modular belt links from which the modular conveyor is assembled. This implies that the hygienic interface structure is also manufactured such that it will fit with standard modular belt links. Typically the pitch will be 2, 4 or 6 inches and as such the distance between eye-parts in the connection structures of the interface structure will also be arranged with similar distances.

In a still further advantageous embodiment of the invention the peripheral device is a hygienic product support interfaced with the interface structure, said hygienic support structure having a support plane extending in the y-axis direction, and having a lower edge towards the conveyor belts' support plane and an upper edge away from the conveyor belts support plane and where the upper edge is provided with an integrated bulge, which bulge extends on both sides of said xy-plane defined by the x- and y-directions.

The bulge along the upper edge creates a wider (less sharp) edge such that products being transferred from one conveyor to a conveyor with a product support having this bulge will not be impacted in the same manner by the product support when they fall from one conveyor onto the other conveyor. This has particularly for fish, an undesirable effect in that it may generate marks or discolouring in the product which are being transported, and as such creates undesirable side effects. The bulge due to its larger dimension distributes the pressure over a larger area such that the risk of creating marks or discolouration is substantially eliminated.

A further feature in this connection is the fact that due to the moulding technique it is possible to have the injection mould divided along the xy-plane such that half the bulge will be in one half of the mould and the other half of the bulge will be in the other half of the mould. This is not possible when, as is the case with traditional injection moulding of modular belt links, the corresponding division of the mould is made in the zx-plane. Also the bulge may be entirely in one half or the other.

Further features also include various designs of the hygienic support as such. In the embodiment discussed above the upper edge was provided with a bulge (or showing a bulbous cross-section), but it is also contemplated that part of the upper section of the support surface may be bent or curved out of the x-y plane. Additionally the ends between the lower edge and the upper edge may be provided with wall segments in the zy-plane, whereby the hygienic support forms a cup. Still further the hygienic support surface in the x-y plane may be provided with drainage apertures, formed for example as holes or slits.

In some embodiments it may also be desirable to provide the peripheral devices surface with a softer layer, for example rubber ribs upstanding from the surface or foam or the like. Such softer layers may either be 2K-molded or applied afterwards.

It shall also be noted that a hygienic interface structure may be provided with any combination of these features, such that for example drainage is provided in a cup shaped support etc.

In further embodiments the connection structures extend on both sides of the xy-plane defined by the x- and y-directions, and where connection structures on one side of the xy-plane are off-set at least one or more times the distance between adjacent eye-parts in the x-direction in the modular belt link into which the product support is to be installed, and/or the connection structures extend on both sides of the xy-plane defined by the x- and y-directions, and where connection structures on one side of the xy-plane are in-line along the intended travelling direction of the conveyor belt, with connection structures on the opposite side.

Also in embodiments the distance in the z-direction between the center of apertures in connection structures arranged on opposite sides of the xy-plane corresponds to the distance between apertures in the forwards extending and rearwards extending eye-parts of the modular belt links from which the modular conveyor is assembled or the peripheral device is a hygienic product support interfaced with the interface structure, said hygienic support structure having a support plane extending in the y-axis direction, and having a lower edge towards the conveyor belts' support plane and an upper edge away from the conveyor belts support plane and where the upper edge is provided with an integrated bulge, which bulge extends on both sides of said xy-plane defined by the x- and y-directions.

In an embodiment the product support has a bulge in a cross-section in a zy-plane has a substantially round, oval or tear shape and/or wherein an upper part of the product support surface has a bent section bent out of the xy-plane, either in a curved cross-section or straight line and/or wherein at least part of the product support surface is provided with drainage openings either in the shape of holes or slits.

Further embodiments see the product support having lateral sides provided with substantially orthogonal walls in a yz-plane, forming a cup, and/or where the support surface is provided with cushioning sections made from a resilient or foam material.

In a particular embodiment the hygienic product support is integral with the main support body, thereby forming a single element whereas in other embodiments the interface between the interface structure and the peripheral device comprises either:

a click-in feature with corresponding and mating protrusions and indentations provided on the interface body and peripheral device respectively or when the peripheral device is mounted on the interface structure a number of overlapping second apertures wherein connecting studs are inserted thereby locking the peripheral device to the interface body, or corresponding and mating adhesive surfaces on the interface body and peripheral device respectively, such that when the adhesive surfaces are brought into contact and adhesive contact is established between the peripheral device and the interface body, or where the interface body and the peripheral device are provided with mating surfaces suitable to be heat fused together.

The invention is also directed to a method of assembling a modular conveyor belt comprising a plurality of interface structures as described above, wherein the conveyor belt is assembled from a plurality of substantially identical modular belt links, where the modular conveyor belt links have a main body extending in an x-direction corresponding to the modular belt link's width direction, and where a plurality of eye parts extend forwards and rearwards in a z-direction from said main body, said eye parts being spaced in the width direction of the modular belt link, where forwards extending eye parts are offset relative to rearwards extending eye parts, such that when two modular conveyor belt links are pushed together the eye parts on one link will inter-fit between eye parts on the other modular belt link, and where either eye parts are removed from at least one of the adjacent modular belt links, where said eye parts are spaced in the x-direction corresponding to the distance in the same direction between the connection structures of the interface structure, and where the interface structure is inter-fitted in the spaces left by the removed eye parts, such that the apertures in the eye parts of the modular belt links and the apertures in the connection structures overlap, whereafter a connection pin is inserted through the overlapping apertures hingely interlocking the interface structure and the adjacent modular belt links or wherein the space between adjacent eye parts is created by the eye parts in the x-direction has a smaller dimension than the distance between adjacent eye parts in the same direction, whereby an opening is provided, where the connection structures are dimensioned to fit inside this opening, whereby the connection pin may also be inserted through the aperture provided near the distal end of the connection structure.

It is clear that such a conveyor belt assembled according to this method will enjoy all the advantageous features of the present invention as already outlined above.

DESCRIPTION OF THE DRAWING

The invention will now be explained with reference to the accompanying drawings wherein FIG. 1 illustrates an asymmetric view of a modular conveyor belt FIG. 2 illustrates a cross-section through part of a conveyor belt where a hygienic interface structure is arranged FIG. 3 illustrates a vertical cross-section through a conveyor belt FIG. 4 illustrates an asymmetric view of a interface structure provided with four connection structures FIG. 5 illustrates a bulge with a substantially circular cross-section FIG. 6a-n illustrate various embodiments of a hygienic product support FIG. 7a-c illustrate various embodiments of peripheral devices.

DETAILED DESCRIPTION OF THE INVENTION

In FIG. 1 is illustrated an asymmetric view of a modular conveyor belt 1 in which an interface structure 5 is provided with a product support 10 according to the present invention is integrated.

In order to clarify the explanation of the present invention a coordinate system comprising three axes has been superposed on the various figures. The x-direction is in the direction of the width of the conveyor belt 1, the y-direction in the direction of the thickness of the conveyor belt 1 and the z-direction in the longitudinal direction of an assembled conveyor belt 1 as illustrated in FIG. 1. The z-direction is furthermore the intended travelling direction of the conveyor belt.

The modular conveyor belt 1 is assembled from a plurality of substantially identical injection moulded modular belt links. In the embodiment illustrated in FIG. 1 it appears as if one single belt module spans the entire width (in the x-direction), but it is known to assemble modular belt links of this type having a number of modular belt links arranged side by side in the x-direction in order to obtain the desired width.

The modular belt links are provided with eye-parts 2, 3 extending in a forward direction and a rearward direction. Furthermore, eye-parts 2 on a forward side of a modular belt link are offset relative to eye-parts 3 on the rearward direction of a modular belt link such that it is possible to interleaf the modular belt links. Furthermore, the eye-parts are provided with apertures 4 such that when the eye-parts are interleafed as described above the apertures 4 will overlap. In this manner it is possible to insert a connection pin (not illustrated) through overlapping apertures and in this manner create a hinge-like connection between adjacent modular belt links.

The interface structure 5 is provided with connection structures 11 where the connection structures 11 arch away from the interface structure's plane (xy-plane). Each connection structure is in a distal end provided with an aperture 4' (see FIGS. 5 and 6) such that when an interface structure 5 according to the present invention is built-into/onto a conveyor belt 1 as explained above the apertures 4' in the connection structures 11 will also be arranged in an overlapping relationship with the apertures 4 in the eye-parts 2, 3. In this manner, when inserting the connection pin, the hygienic interface structure will be locked into the conveyor belt in a manner similar to adjacent belt links.

The interface structure 5 is built into a conveyor belt by making room in the modular belt such that the connection structures 11 may be arranged adjacent eye parts and connected laterally by the connection pin.

In order for the interface structure 5 to be integrated in the conveyor belt 1 the distance "c" between the connection structures 11 shall be a multiple of the distance between eye-parts 2, 3. Furthermore, the dimension of the connection structure 11 itself and particularly the aperture 4' shall be such that it is possible to interleaf the connection structure with the aperture in between adjacent eye-parts 3, 4 in either the rear side or the forward side or both of a modular belt link.

During the construction or after installation of a conveyor belt made of modular belt links a number of eye-parts will be removed prior to arranging the hygienic interface structure 10 in the belt.

Turning to FIG. 2 a cross-section through part of a conveyor belt where an interface structure 5 is arranged is illustrated.

In the y-direction the interface structure 5 has a lower edge 13 (see also FIG. 1). As illustrated in FIG. 2 there is an open space 14 between the upper side 6 of the conveyor belt and the lower edge 13 of the interface structure 5. Furthermore, the interface structure 5 has a main support body 25 providing stability to the interface structure and the connection structures 11. In the illustration part of a product support 10 may be seen extending up from the main support body 25.

Advantageously, this space 14 is dimensioned such that products which are transported on the conveyor belt 1 are not able to slide under the interface structure 5, but on the other hand the space 14 has a sufficient dimension such that it is possible to efficiently clean the conveyor belt's surface between the upper side 6 of the conveyor belt and the lower edge 13 of the interface structure 5.

This distance may be decided/determined by the distance a between the upper side of the conveyor belt 6 and the distance to the lower edge 13 of the interface structure 10. Tests have indicated that designing the connection structures such that the distance a is between 0 mm and 40 mm will provide sufficient space 14 and at the same time provide sufficient support for products transported on the conveyor belt 1. It is clear that with a distance of 0 mm the interface structure 5 is in contact with the upper surface of the conveyor belt 6, and no open space is available. For cleaning purposes this is no problem as no foreign matter will be lodged in the non-existent space. Furthermore, it is foreseen that the space 14 is selected according to the application, such that even for small spaces 14, the nature of the objects/material to be transported will allow for through cleaning.

In FIG. 3 is illustrated a vertical cross-section through a conveyor belt on which conveyor belt 1 an interface structures with a product support 10 according to the present invention is arranged. In this embodiment four sets of connection structures 11 are arranged to be integrated in the conveyor belt 1, and the interface structure in the x-direction does not extend all the way to the edges of the conveyor belt 1. This is due to the fact that many conveyor structures will have fixed side limitations, particularly on inclined passages such that product transported on the conveyor 1 will not be able to spill off the sides of the conveyor belt, but will be maintained on the conveyor belt 1 by these side limitations (not illustrated).

In FIG. 4 is illustrated an asymmetric view of an interface structure 5 with a product support 10 provided with four connection structures 11 extending in an arched manner away from the main support body 25 of the interface structure 5. The product support has a support face 15. In this embodiment the upper edge 12 of the product support 10 is provided with a bulge 16. This bulge has a cross-section as illustrated with reference to FIG. 5, a substantially circular cross-section and serves to lessen the impact of products/materials transferred to the conveyor belt which may accidentally hit the bulge. For certain types of products, particularly fish, vegetables and other fragile products, the impact against the product support may more or less mark or crack the product which is being transferred to the conveyor belt, and therefore by providing the bulge 16 the impact area is enlarged thereby providing a larger area to distribute the impact force which is thereby lessened as compared to a normal product supports.

Furthermore, as the product support may be manufactured by an injection moulding process the two mould halves defining the cavity may be divided along the xy-plane such that the bulge can be cast directly at the same time as casting the entire product support.

In FIG. 6a-n are illustrated various embodiments of the hygienic interface structure 5 with product supports 10. In FIG. 6a is illustrated a view of a product support in an xy-plane and the same product support is illustrated in FIG. 6b in an yz-plane. The product support 10 is provided with a curved upper section 21. Furthermore, the ends of the product support 10 are provided with walls 22 such that the product support is provided with a cup shape. Furthermore, the support surface 15 of the product support is provided with apertures 23 such that any liquid, for example water, may drain off the product support during steep inclines or declines.

Turning to FIGS. 6c and 6d a similar construction is provided. However, the drainage structure in this embodiment is in the shape of slits 24. Otherwise like features are provided with like reference numbers.

In FIGS. 6c and 6f is illustrated a product support substantially as illustrated with reference to FIGS. 6a-d, however, in this embodiment the product support surface 15 is not provided with drainage means, but is constituted by a substantially coherent surface.

In the embodiment illustrated with reference to FIGS. 6g and 6h a product support without end-walls is illustrated, however, an upper section of the product support is provided with a bent section as was the case above.

Furthermore, with reference to FIG. 6i-j a product support also having a bent section, but in this embodiment the bent section 21' is created by creating a sharp bend 27 whereas the curved sections 21 discussed above are more in the shape of a soft curve.

In FIG. 6k-l is illustrated a product support 10 substantially corresponding to the product support discussed above with reference to FIG. 5.

Finally, turning to FIG. 6m-n a product support 10 provided with soft zones 26 on the product support surface 15. The soft zones may for example be provided by ribs extending from the xy-plane of the product support where the ribs are made from a soft material, for example rubber or another suitable elastomer or the soft zones may be made by foam or any other resilient material.

In FIG. 7a is illustrated an interface structure 5, with a peripheral device. In the main support body 25 is provided a ball cage 30 in which a ball 31 is rotatably accommodated.

In FIG. 7b is illustrated an embodiment where a brush comprising an engagement part 32 and bristles 33 is attached to the interface structure 5, such that the bristles 33 appears at an angle to the conveyor belts surface 6.

Further in FIG. 7c an embodiment where the peripheral device is in the shape of a high friction plate 34 is illustrated.

The invention claimed is:

1. An interface structure for allowing peripheral devices to be mounted onto a modular conveyor belt, where the interface structure is configured for installation in or on a modular conveyor belt, where the conveyor belt is of the type assembled from a plurality of substantially identical modular belt links where one or more modular belt links forms lateral rows, where each modular belt link has a main body extending in the modular belt link's width direction, and where a plurality of eye parts extend forwards and rearwards from the main body, the eye parts being spaced in the width direction of the modular belt link creating an opening between adjacent eye parts, such that when two modular conveyor belt links are pushed together, the eye parts on one link will inter-fit between eye parts on the other modular belt link, and where lateral apertures in all eye parts are provided, such that when the eye parts of modular belt links in one row are overlapping eye parts in an adjacent row a through-going aperture is formed from side to side of the conveyor belt, and by inserting a connection pin through the lateral through-going aperture, adjacent modular belt links will be hingedly connected, where the interface structure is provided with a main support body having a width in an x-direction, a height in a y-direction, and a thickness in a z-direction, and where a plurality of connection structures extend from an xy-plane defined by the x- and y-directions, the connection structures extending away from the xy-plane, such that part of each connection structure extends past the lower edge of the main support body, and where the distance in the x-direction between adjacent connection structures corresponds to one or more times the distance between adjacent eye-parts in the modular belt link into which the interface structure is to be installed, and where adjacent a distal end of the connection structures an aperture in the x-direction through the distal end of the connection structure is provided, such that either:
- by removing one or more eye parts from modular belt links in a row without removing the modular belt links as such, the distal end of the connection structures comprising the aperture through the distal end of the connection structure of the interface structure may be inserted in the space left by the removed eye parts such that the connection pin may pass through the aperture provided in the distal end of the connection structure of the interface structure, thereby integrating the interface structure into the modular conveyor belt, or
- the eye parts of adjacent modular belt links are spaced sufficiently laterally, thereby creating an opening, where the distal end of the connection structure of the interface structure may be inserted in the space between two eye parts such that the connection pin may pass through the aperture provided in the distal end of the connection structure of the interface structure, thereby integrating the interface structure into the modular conveyor belt,
- further wherein the distance in the z-direction between the center of apertures in connection structures arranged on opposite sides of the xy-plane corresponds to the distance between apertures in the forwards extending and rearwards extending eye-parts of the modular belt links from which the modular conveyor is assembled.

2. The interface structure according to claim 1, wherein the distance a in the y-direction between the load carrying surface of the conveyor belt and the lower edge of the main support body is between 0 mm and 40 mm, or 1.5 mm to 30 mm.

3. The interface structure according to claim 1, wherein connection structures extend on both sides of the xy-plane defined by the x- and y-directions, and where connection structures on one side of the xy-plane are off-set at least one or more times the distance between adjacent eye-parts in the x-direction in the modular belt link into which the interface structure is to be installed.

4. The interface structure according to claim 1, wherein connection structures extend on both sides of the xy-plane defined by the x- and y-directions, and where connection structures on one side of the xy-plane are in-line along the intended travelling direction of the conveyor belt, with connection structures on the opposite side.

5. The interface structure according to claim 1, wherein the peripheral device is a hygienic product support interfaced with the interface structure, the hygienic support structure having a support plane extending in the y-axis direction, and having a lower edge towards the conveyor belts' support plane and an upper edge away from the conveyor belts support plane and where the upper edge is provided with an integrated bulge, which bulge extends on both sides of the xy-plane defined by the x- and y-directions.

6. The interface structure according to claim 5, wherein the bulge in a cross-section in a zy-plane has a substantially round, oval or tear shape.

7. The interface structure according to claim 5, wherein an upper part of the product support surface has a bent section bent out of the xy-plane, either in a curved cross-section or straight line.

8. The interface structure according to claim 5, wherein at least part of the product support surface is provided with drainage openings either in the shape of holes or slits.

9. The interface structure according to claim 5, wherein lateral sides of the product support surface are provided with substantially orthogonal walls in a yz-plane, forming a cup, and/or where the support surface is provided with cushioning sections made from a resilient or foam material.

10. The interface structure according to claim 5, wherein the hygienic product support is integral with the main support body, thereby forming a single element.

11. The interface structure according to claim 1, wherein the interface between the interface structure and the peripheral device comprises either:
- a click-in feature with corresponding and mating protrusions and indentations provided on the interface body and peripheral device respectively or
- when the peripheral device is mounted on the interface structure a number of overlapping second apertures wherein connecting studs are inserted thereby locking the peripheral device to the interface body, or
- corresponding and mating adhesive surfaces on the interface body and peripheral device respectively, such that when the adhesive surfaces are brought into contact and adhesive contact is established between the peripheral device and the interface body, or
- where the interface body and the peripheral device are provided with mating surfaces suitable to be heat fused together.

12. A method of assembling a modular conveyor belt comprising a plurality of interface structures according to claim 1, wherein the conveyor belt is assembled from a plurality of substantially identical modular belt links, where the modular conveyor belt links have a main body extending in an x-direction corresponding to the modular belt link's width direction, and where a plurality of eye parts extend forwards and rearwards in a z-direction from the main body, the eye parts being spaced in the width direction of the modular belt link creating an opening between adjacent eye parts, such that when two modular conveyor belt links are pushed together the eye parts on one link will inter-fit between eye parts on the other modular belt link, and where lateral apertures in all eye parts are provided, such that when the eye parts of modular belt links in one row are overlapping eye parts in an adjacent row a through-going aperture is formed from side to side of the conveyor belt, and by inserting a connection pin through the lateral through-going aperture, adjacent modular belt links will be hingedly connected and where a space is provided between adjacent eye parts, where the eye parts are spaced in the x-direction corresponding to the distance in the same direction between the connection structures of the interface structure, such that the interface structure may be inter-fitted in the spaces between adjacent eye parts, such that the apertures in the eye parts of the modular belt links and the apertures in the connection structures overlap, whereafter a connection pin is inserted through the overlapping apertures hingedly interlocking the interface structure and the adjacent modular belt links.

13. The method according to claim 12, wherein the space between adjacent eye parts is created by removing eye parts from at least one of the adjacent modular belt links, where the eye parts are spaced in the x-direction corresponding to the distance in the same direction between the connection structures of the interface structure, and where the interface structure is inter-fitted in the spaces left by the removed eye parts, such that the apertures in the eye parts of the modular belt links and the apertures in the connection structures overlap, whereafter a connection pin is inserted through the overlapping apertures hingedly interlocking the interface structure and the adjacent modular belt links.

14. The method according to claim 12, wherein the space between adjacent eye parts is created by the eye parts in the x-direction has a smaller dimension than the distance between adjacent eye parts in the same direction, whereby an opening is provided, where the connection structures are dimensioned to fit inside this opening, whereby the connection pin may also be inserted through the aperture provided near the distal end of the connection structure.

* * * * *